US010168051B2

(12) United States Patent
Bloom et al.

(10) Patent No.: US 10,168,051 B2
(45) Date of Patent: Jan. 1, 2019

(54) COMBUSTOR ASSEMBLY FOR A TURBINE ENGINE

(71) Applicant: General Electric Company, Schenectady, CT (US)

(72) Inventors: Nicholas John Bloom, Maineville, OH (US); Michael Alan Stieg, Cincinnati, OH (US); Brian Christopher Towle, Leawood, KS (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 14/842,867

(22) Filed: Sep. 2, 2015

(65) Prior Publication Data

US 2017/0059166 A1   Mar. 2, 2017

(51) Int. Cl.
| | | |
|---|---|---|
| *F23R 3/00* | (2006.01) | |
| *F23R 3/60* | (2006.01) | |
| *F02C 3/04* | (2006.01) | |
| *F23R 3/50* | (2006.01) | |

(Continued)

(52) U.S. Cl.
CPC ............... *F23R 3/60* (2013.01); *F02C 3/04* (2013.01); *F02C 3/14* (2013.01); *F16C 29/02* (2013.01); *F23R 3/002* (2013.01); *F23R 3/007* (2013.01); *F23R 3/50* (2013.01); *F05D 2220/32* (2013.01); *F05D 2240/90* (2013.01); *F05D 2260/941* (2013.01); *F23M 2900/05002* (2013.01)

(58) Field of Classification Search
CPC .. F23R 3/002; F23R 3/007; F23R 3/50; F23R 3/60; F23R 2900/00017; F02C 7/20
See application file for complete search history.

(56) References Cited

U.S. PATENT DOCUMENTS

| | | |
|---|---|---|
| 3,604,716 A | 9/1971 | Webert |
| 4,363,208 A | 12/1982 | Hoffman et al. |
| 5,180,282 A | 1/1993 | Lenhart et al. |

(Continued)

FOREIGN PATENT DOCUMENTS

| | | |
|---|---|---|
| CN | 1590850 A | 3/2005 |
| CN | 101922354 A | 12/2010 |

(Continued)

OTHER PUBLICATIONS

EP SR dated Jan. 30, 2017 for related EP App. No. 16185939.2.

(Continued)

*Primary Examiner* — Todd E Manahan
*Assistant Examiner* — Rene Ford
(74) *Attorney, Agent, or Firm* — General Electric Company; William Andes

(57) ABSTRACT

A combustor assembly for a gas turbine engine is provided. The combustor assembly generally includes an annular dome and a liner. The liner at least partially defines a combustion chamber and includes the forward end received within a slot defined by the annular dome. A mounting assembly attaches the forward end of the liner to the annular dome. The mounting assembly includes a pin extending through the slot and the forward end of the annular dome. The mounting assembly also includes a grommet positioned in an opening in the forward end of the liner. The grommet is also positioned around the pin to protect the liner during operation of the gas turbine engine.

13 Claims, 3 Drawing Sheets

(51) Int. Cl.
*F02C 3/14* (2006.01)
*F16C 29/02* (2006.01)

(56) References Cited

U.S. PATENT DOCUMENTS

| | | | |
|---|---|---|---|
| 5,291,732 A | 3/1994 | Halila | |
| 5,291,733 A | 3/1994 | Halila | |
| 5,330,321 A | 7/1994 | Roberts et al. | |
| 5,680,767 A | 10/1997 | Lee et al. | |
| 5,996,335 A | 12/1999 | Ebel | |
| 6,234,755 B1 | 5/2001 | Bunker et al. | |
| 6,383,602 B1 | 5/2002 | Fric et al. | |
| 6,397,603 B1 | 6/2002 | Edmondson et al. | |
| 6,401,447 B1 | 6/2002 | Rice et al. | |
| 6,435,514 B1 | 8/2002 | Aksit et al. | |
| 6,655,148 B2 | 12/2003 | Calvez et al. | |
| 6,668,559 B2 * | 12/2003 | Calvez | F23R 3/007 60/753 |
| 6,840,519 B2 | 1/2005 | Dinc et al. | |
| 6,904,757 B2 | 6/2005 | Mitchell et al. | |
| 7,237,389 B2 | 7/2007 | Ryan et al. | |
| 7,328,580 B2 | 2/2008 | Lee et al. | |
| 7,572,099 B2 | 8/2009 | Addis | |
| 7,849,696 B2 | 12/2010 | De Sousa et al. | |
| 7,997,867 B1 | 8/2011 | Shih et al. | |
| 8,057,179 B1 | 11/2011 | Liang | |
| 8,057,181 B1 | 11/2011 | Liang | |
| 8,141,370 B2 | 3/2012 | Bulman et al. | |
| 8,141,371 B1 | 3/2012 | Habarou et al. | |
| 8,556,531 B1 | 10/2013 | Bird et al. | |
| 8,572,981 B2 | 11/2013 | Bunker | |
| 8,607,577 B2 | 12/2013 | Ruberte et al. | |
| 8,689,586 B2 | 4/2014 | Hirayama et al. | |
| 8,739,547 B2 | 6/2014 | Jarmon et al. | |
| 8,756,935 B2 | 6/2014 | Duval et al. | |
| 8,834,056 B2 | 9/2014 | Keith et al. | |
| 8,863,527 B2 | 10/2014 | Holcomb et al. | |
| 9,097,211 B2 | 8/2015 | Martinez et al. | |
| 9,127,565 B2 | 9/2015 | Keller et al. | |
| 9,423,129 B2 | 8/2016 | Graves et al. | |
| 2004/0118122 A1 | 6/2004 | Mitchell et al. | |
| 2004/0134198 A1 | 7/2004 | Mitchell et al. | |
| 2005/0016178 A1 | 1/2005 | Wasif et al. | |
| 2005/0050902 A1 | 3/2005 | Anichini et al. | |
| 2005/0135931 A1 | 6/2005 | Nakamata et al. | |
| 2007/0128002 A1 | 6/2007 | Geary et al. | |
| 2008/0112798 A1 * | 5/2008 | Seitzer | F01D 11/24 415/144 |
| 2008/0286090 A1 | 11/2008 | Okita | |
| 2010/0263386 A1 | 10/2010 | Edwards et al. | |
| 2011/0097191 A1 | 4/2011 | Bunker | |
| 2011/0271684 A1 | 11/2011 | Corsmeier et al. | |
| 2011/0293423 A1 | 12/2011 | Bunker et al. | |
| 2011/0305583 A1 | 12/2011 | Lee et al. | |
| 2013/0175015 A1 | 7/2013 | Tanaka et al. | |
| 2013/0205787 A1 | 8/2013 | Zelesky et al. | |
| 2013/0205791 A1 | 8/2013 | Mongillo et al. | |
| 2013/0205792 A1 | 8/2013 | Gleiner et al. | |
| 2013/0209229 A1 | 8/2013 | Xu et al. | |
| 2013/0209236 A1 | 8/2013 | Xu | |
| 2013/0209269 A1 | 8/2013 | Gleiner et al. | |
| 2015/0016971 A1 | 1/2015 | Freeman | |
| 2015/0330633 A1 | 11/2015 | Graves et al. | |
| 2016/0047549 A1 | 2/2016 | Landwehr et al. | |
| 2016/0215980 A1 | 7/2016 | Chang | |
| 2016/0215981 A1 | 7/2016 | Dery | |
| 2016/0265389 A1 | 9/2016 | Jarmon | |

FOREIGN PATENT DOCUMENTS

| | | |
|---|---|---|
| CN | 102877901 A | 1/2013 |
| CN | 204532553 U | 8/2015 |
| DE | 102013220482 B3 | 4/2015 |
| EP | 1445537 A2 | 8/2004 |
| EP | 1719949 A2 | 11/2006 |
| EP | 1741981 A1 | 1/2007 |
| EP | 1777461 A2 | 4/2007 |
| EP | 2366678 A2 | 9/2011 |
| FR | 3004518 A1 | 10/2014 |
| FR | 3022480 A1 | 12/2015 |
| WO | 2013188645 A2 | 12/2013 |
| WO | 2014137444 A2 | 9/2014 |
| WO | 2014189589 A2 | 11/2014 |
| WO | 2015038274 A1 | 3/2015 |

OTHER PUBLICATIONS

EP SR & WO dated Feb. 1, 2017 for related Application No. 16185947.5.
EP SR & WO dated Feb. 6, 2017 for related Application No. 16185945.9.
EP Search Report dated Jan. 30, 2017 issued in connection with related Application No. 16185939.2.
EP Search Report & WO dated Feb. 1, 2017 issued in connection with related Application No. 16185947.5.
EP Search Report & WO dated Feb. 6, 2017 issued in connection with related Application No. 16185945.9.
GE Related Case Form.
EP Search Report dated Jan. 26, 2017 for Application No. 16185942.6.
Nicholas John Bloom, U.S. Appl. No. 14/842,872, filed Sep. 2, 2015.
Nicholas John Bloom, U.S. Appl. No. 14/842,883, filed Sep. 2, 2015.
Nicholas John Bloom, U.S. Appl. No. 14/842,954, filed Sep. 2, 2015.
Machine translation and a copy of Office Action issued in connection with corresponding CN Application No. 201610777189.4 dated Jul. 30, 2018.

* cited by examiner

COMBUSTOR ASSEMBLY FOR A TURBINE ENGINE

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given an ability for CMC materials to withstand relatively extreme temperatures, there is particular interest in replacing components within the combustion section of the gas turbine engine with CMC materials. More particularly, an inner liner and an outer liner of gas turbine engines are more commonly being formed of CMC materials.

However, certain gas turbine engines have had problems accommodating certain mechanical properties of the CMC materials incorporated therein. For example, CMC materials have different coefficients of thermal expansion than the traditional metal materials. Such differing mechanical properties can make it difficult to attach the outer liner to an outer metallic dome and the inner liner to an inner metallic dome. Attachment mechanisms have been provided that allow for some radial movement of the outer liner relative to the outer metallic dome and the inner liner relative to the inner metallic dome. However, such attachment mechanisms can prematurely wear one or both of the components and/or place and undesirably high amount of stress on one or both of the components.

Accordingly, an attachment mechanism for mounting an outer liner to an outer dome and/or an inner liner to an inner dome without prematurely wearing one or more of such components would be useful. Further, an attachment mechanism for mounting an outer liner to an outer dome and/or an inner liner to an inner dome without placing and undesirably high amount of stress on one or more of the components would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a combustor assembly is provided for a gas turbine engine. The combustor assembly includes an annular dome including an enclosed surface defining a slot and a liner at least partially defining a combustion chamber. The liner extends between an aft end and a forward end. The forward end of the liner is received within the slot of the annular dome. The combustor assembly also includes a mounting assembly including a pin extending through the slot and an opening in the forward end of the liner. The mounting assembly further includes a grommet positioned in the opening in the forward end of the liner around the pin to protect the liner.

In another exemplary embodiment of the present disclosure a mounting assembly is provided for attaching a forward end of a liner to an annular dome within a slot of the annular dome. The mounting assembly includes a pin, a bushing positioned around the pin, and a metal grommet positioned around the bushing and slidable along the bushing. The grommet includes a body, an inner collar, and an outer collar. The metal grommet is configured to be positioned within an opening in the forward end of the liner such that the inner collar is positioned adjacent to an inner surface of the liner and the outer collar is positioned adjacent to an outer surface of the liner.

In yet another exemplary embodiment of the present disclosure, a gas turbine engine is provided. The gas turbine engine includes a compressor section, a turbine section mechanically coupled to the compressor section through a shaft, and a combustor assembly disposed between the compressor section and the turbine section. The combustor assembly includes an annular dome including an enclosed surface defining a slot and a liner at least partially defining a combustion chamber. The liner extends between an aft end and a forward end, the forward end of the liner received within the slot of the annular dome. The combustor assembly also includes a mounting assembly including a pin extending through the slot and an opening in the forward end of the liner. The mounting assembly further includes a grommet positioned in the opening in the forward end of the liner around the pin to protect the liner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
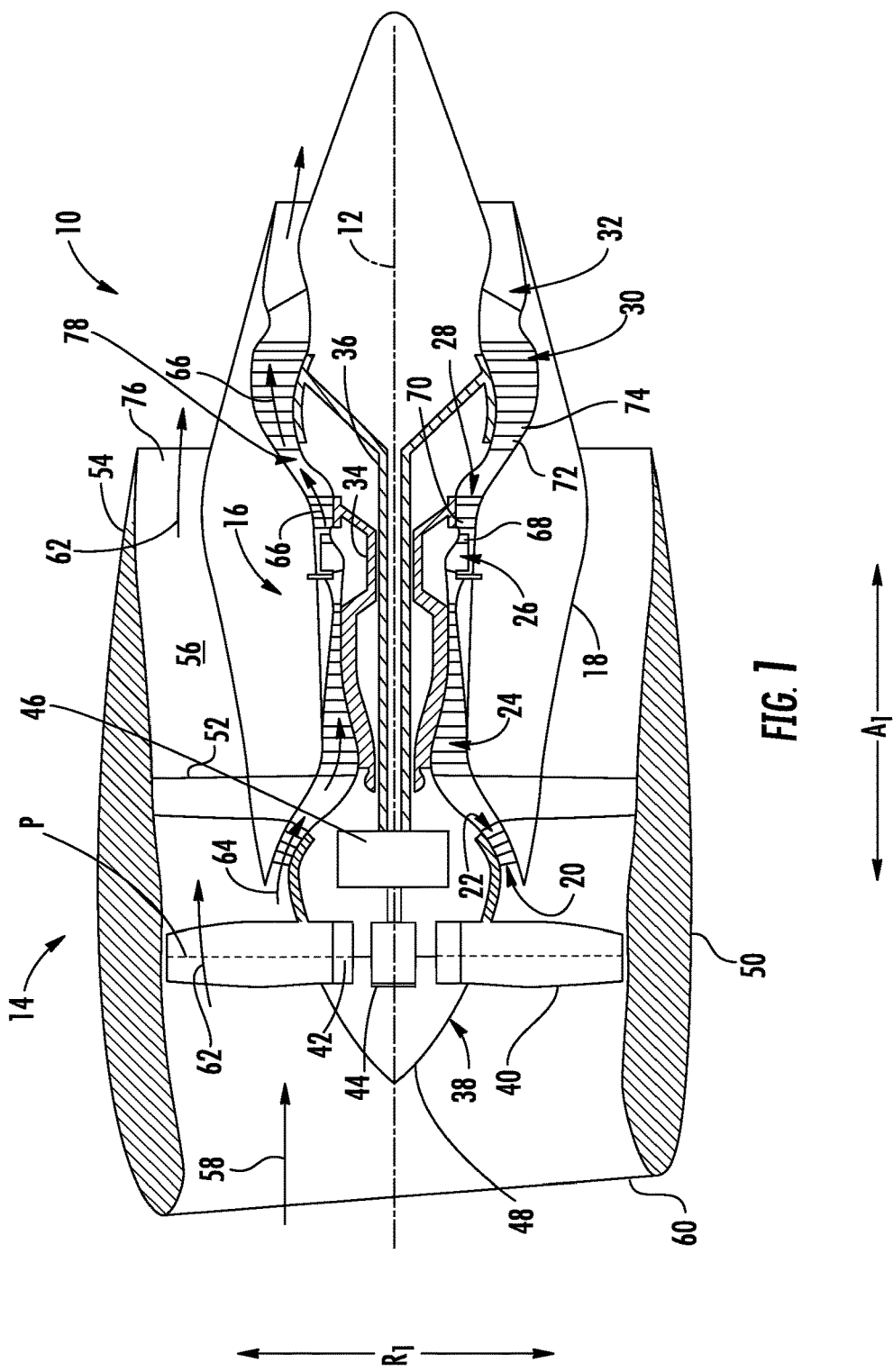
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration.

Figure 2:
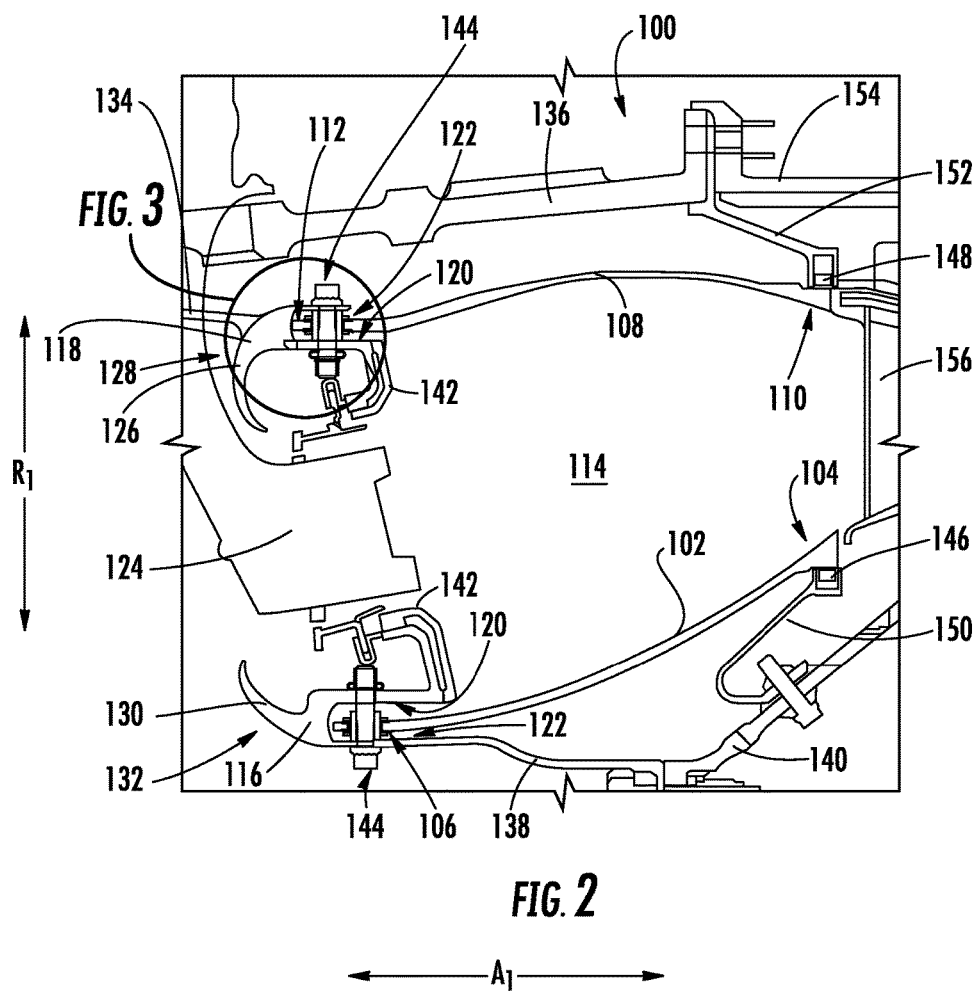
FIG. 2 is a schematic, cross-sectional view of a combustor assembly in accordance with an exemplary embodiment of the present disclosure.

Referring now to FIG. 2, a close-up cross-sectional view is provided of a combustor assembly 100 in accordance with an exemplary embodiment of the present disclosure. For example, the combustor assembly 100 of FIG. 2 may be positioned in the combustion section 26 of the exemplary turbofan engine 10 of FIG. 1. More particularly, FIG. 2 provides a side, cross-sectional view of the exemplary combustor assembly 100 of FIG. 2.

As shown, the combustor assembly 100 generally includes an inner liner 102 extending between and aft end 104 and a forward end 106 generally along the axial direction $A_1$, as well as an outer liner 108 also extending between and aft end 110 and a forward end 112 generally along the axial direction $A_1$. The inner and outer liners 102, 108 together at least partially define a combustion chamber 114 therebetween. The inner and outer liners 102, 108 are each attached to an annular dome. More particularly, the combustor assembly 100 includes an inner annular dome 116 attached to the forward end 106 of the inner liner 102 and an outer annular dome 118 attached to the forward end 112 of the outer liner 108. As will be discussed in greater detail below, the inner and outer annular domes 116, 118 each include an enclosed surface 120 defining a slot 122 for receipt of the forward end 106 of the inner liner 102, and the forward end 112 of the outer liner 108, respectively.

The combustor assembly 100 further includes a plurality of fuel air mixers 124 spaced along a circumferential direction within the outer dome 118. More particularly, the plurality of fuel air mixers 124 are disposed between the outer dome 118 and the inner dome 116 along the radial direction $R_1$. Compressed air from the compressor section of the turbofan engine 10 flows into or through the fuel air mixers 124, where the compressed air is mixed with fuel and ignited to create the combustion gases 66 within the combustion chamber 114. The inner and outer domes 116, 118 are configured to assist in providing such a flow of compressed air from the compressor section into or through the fuel air mixers 124. For example, the outer dome 118 includes an outer cowl 126 at a forward end 128 and the inner dome 116 similarly includes an inner cowl 130 at a forward end 132. The outer cowl 126 and inner cowl 130 may assist in directing the flow of compressed air from the compressor section 26 into or through one or more of the fuel air mixers 124.

Moreover, the inner and outer domes 116, 118 each include attachment portions configured to assist in mounting the combustor assembly 100 within the turbofan engine 10. For example, the outer dome 118 includes an attachment extension 134 configured to be mounted to an outer combustor casing 136 and the inner dome 116 includes a similar attachment extension 138 configured to attach to an annular support member 140 within the turbofan engine 10. In certain exemplary embodiments, the inner dome 116 may be formed integrally as a single annular component, and similarly, the outer dome 118 may also be formed integrally as a single annular component. It should be appreciated, however, that in other exemplary embodiments, the inner dome 116 and/or the outer dome 118 may alternatively be formed by one or more components being joined in any suitable manner. For example, with reference to the outer dome 118, in certain exemplary embodiments, the outer cowl 126 may be formed separately from the outer dome 118 and attached to the forward end 128 of the outer dome 118 using, e.g., a welding process. Similarly, the attachment extension 134 may also be formed separately from the outer dome 118 and attached to the forward end 128 of the outer dome 118 using, e.g., a welding process. Additionally, or alternatively, the inner dome 116 may have a similar configuration.

Referring still to FIG. 2, the exemplary combustor assembly 100 further includes a heat shield 142 positioned around the fuel air mixer 124 depicted. The exemplary heat shield 142, for the embodiment depicted, is attached to and extends between the outer dome 118 and the inner dome 116. The heat shield 142 is configured to protect certain components of the turbofan engine 10 from the relatively extreme temperatures of the combustion chamber 114.

For the embodiment depicted, the inner liner 102 and the outer liner 108 are each formed of a ceramic matrix composite (CMC) material, which is a non-metallic material having high temperature capability and low ductility. Exemplary CMC materials utilized for such liners 102, 108 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

By contrast, the inner dome 116 and outer dome 118 may be formed of a metal, such as a nickel-based superalloy (having a coefficient of thermal expansion of about $8.3\text{-}8.5 \times 10^6$ in/in/° F. in a temperature of approximately 1000-1200° F.) or cobalt-based superalloy (having a coefficient of thermal expansion of about $7.8\text{-}8.1 \times 10^6$ in/in/° F. in a temperature of approximately 1000-1200° F.). Thus, the inner and outer liners 102, 108 may be better able to handle the extreme temperature environment presented in the combustion chamber 114. However, attaching the inner and outer liners 102, 108 to the inner and outer annular domes 116, 118 may present a problem due to the differing mechanical characteristics of the components. Accordingly, as will be discussed below, a plurality of specially designed mounting assemblies 144 are utilized to attach the forward end 112 of the outer liner 108 to the outer annular dome 118, and the forward end 106 of the inner liner 102 to the inner dome 116. The mounting assemblies 144 are configured to accommodate the relative thermal expansion between the inner and outer domes 116, 118 and the inner and outer liners 102, 108 along the radial direction $R_1$.

Referring still to FIG. 2, at the aft end 104 of the inner liner 102 and at the aft end 110 of the outer liner 108, the combustor assembly 100 includes an inner piston ring 146 and an outer piston ring 148, respectively. The inner piston ring 146 is attached to an inner piston ring holder 150 extending from and attached to an interior casing (which for the embodiment depicted is the annular support member 140). Similarly, the outer piston ring 148 is attached to an outer piston ring holder 152 extending from and attached to an outer casing (which for the embodiment depicted includes the outer combustor casing 136 and an outer turbine casing 154). The inner piston ring holder 150 and the outer piston ring holder 152 are configured to accommodate an expansion of the inner liner 102 and the outer liner 108 generally along the axial direction $A_1$, as well as generally along the radial direction $R_1$.

As will be discussed in greater detail below, the above configuration may allow for the relative thermal expansions of the inner and outer liners 102, 108, each formed of a CMC material, and the inner and outer domes 116, 118, each formed of a metal material, during operation of the turbofan engine 10.

Referring still to FIG. 2, and as is discussed above, the combustion gases 66 flow from the combustion chamber 114 into and through the turbine section of the turbofan engine 10 where a portion of thermal and/or kinetic energy from the combustion gases 66 is extracted via sequential stages of turbine stator vanes and turbine rotor blades. A stage 1 turbine blade 156 is depicted schematically in FIG. 3, aft of the combustor assembly 100.

Figure 3:
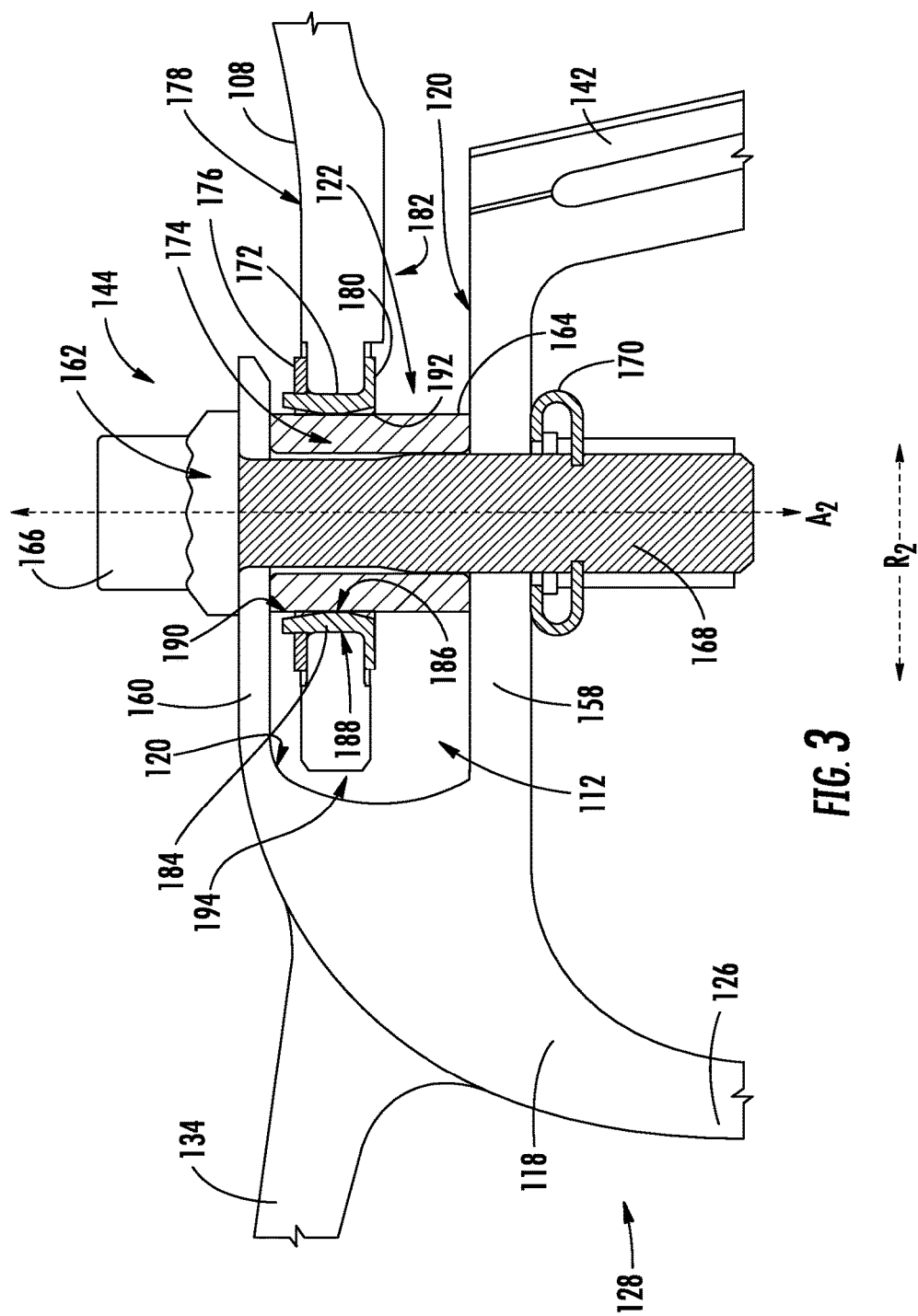
FIG. 3 is a close up, cross-sectional view of an attachment point of the exemplary combustor assembly of FIG. 2, where a forward end of an outer liner is attached to an outer annular dome.

Referring now to FIG. 3, a close up, schematic, cross-sectional view is depicted of an attachment point where the forward end 112 of the outer liner 108 is mounted to the outer annular dome 118 within the slot 122 of the outer annular dome 118.

As stated, to allow for a relative thermal expansion between the outer liner 108 and the outer dome 118, as well as between the inner liner 102 and the inner dome 116, a plurality of mounting assemblies 144 are used to attach the outer liner 108 to the outer dome 118 and the inner liner 102 to the inner dome 116. More particularly, the mounting assemblies 144 attach the forward end 112 of the outer liner 108 to the outer annular dome 118 within the slot 122 of the outer dome 118 and the forward end 106 of the inner liner 102 to the inner annular dome 116 within the slot 122 of the inner annular dome 116 (see FIG. 2).

Referring particularly to the forward end 112 of the outer liner 108 and the outer annular dome 118 depicted in FIG. 3, the outer dome 118 includes a base plate 158 and a yolk 160. The base plate 158 and the yolk 160 each extend substantially parallel to one another, which for the embodiment depicted is a direction substantially parallel to the axial direction $A_1$ of the turbofan engine 10 (see also FIG. 2). Notably, the enclosed surface 120 of the outer annular dome 118 includes a surface of the base plate 158 and a surface of the yolk 160, such that the slot 122 is defined between the base plate 158 and the yolk 160. Further, in certain exemplary embodiments, the yolk 160 may extend circumferentially with the outer dome 118, tracking the base plate 158. With such a configuration, the slot 122 may be considered an annular slot. However, in other embodiments, the yolk 160 may include a plurality of circumferentially spaced tabs, each of the individual tabs of the yolk 160 defining individual segmented portions of the slot 122 with the base plate 158.

Additionally, the exemplary mounting assembly 144 depicted extends through the yolk 160 of the outer dome 118, the forward end 112 of the outer liner 108 (positioned in the slot 122), and the base plate 158 of the outer dome 118. More particularly, for the embodiment depicted, the mounting assembly 144 includes a pin 162 and a bushing 164. The pin 162 includes a head 166 and a shank 168, the shank 168 extending through the yolk 160, the forward end 112 of the outer liner 108 (positioned in the slot 122), and the base plate 158. A nut 170 is attached to a distal end of the shank 168 of the pin 162. In certain exemplary embodiments, the pin 162 may be configured as a bolt and the nut 170 may be rotatably engaged with a threaded portion of the pin 162 (at, e.g., the distal end of the shank 168) for tightening the mounting assembly 144. Alternatively, however, in other exemplary embodiments the pin 162 and nut 170 may have any other suitable configuration. For example, in other exemplary embodiments, the pin 162 may include a shank 168 defining a substantially smooth cylindrical shape and the nut 170 may be configured as a clip.

Additionally, the bushing 164 is generally cylindrical in shape and positioned around the shank 168 of the pin 162 within the slot 122. For the embodiment depicted, the bushing 164 is pressed between the yolk 160 and the base plate 158 by tightening the nut 170 on the pin 162. Moreover, for the embodiment depicted, the mounting assembly 144 includes a metal grommet 172 positioned around the bushing 164 and pin 162. The grommet 172 is positioned in an opening 174 in the forward end 112 of the outer liner 108. The grommet 172 includes an outer collar 176 positioned adjacent to an outside surface 178 of the outer liner 108 and an inner collar 180 positioned adjacent to an inside surface 182 of the outer liner 108. The grommet 172 additionally includes a body 184. For the embodiment depicted, at least one of the inner collar 180 or the outer collar 176 is attached to the body 184 by swaging. More particularly, for the embodiment depicted, the outer collar 176 is attached to the body 184 of the grommet 172 by swaging. For example, the body 184 and the inner collar 180 may be formed integrally, e.g., by casting, and positioned in the opening 174 in the forward end 112 of the outer liner 108. The outer collar 176 of the grommet 172 may then be positioned on the body 184 of the grommet 172 adjacent to the outside surface 178 of the outer liner 108 and swaged to the outer collar 176 of the grommet 172 to the body 184 of the grommet 172. It should be appreciated, however, that in other embodiments, the grommet 172 may be formed in any other suitable manner, and may be positioned in the opening 174 in the forward end 112 of the outer liner 108 in any other suitable manner. For example, in other exemplary embodiments, the inner collar 180 may also be attached to the body 184 of the grommet 172 by, e.g., swaging. Further, in still other embodiments, at least one of the inner collar 180 or outer collar 176 may additionally, or alternatively, be attached to the body 184 of the grommet 172 in any other suitable manner. For example, in other embodiments, at least one of the inner collar 180 or outer collar 176 may be welded to the body 184 of the grommet 172, or alternatively may be rotatably engaged with the body 184 of the grommet 172. It should be appreciated, that as used herein, the term "swaging" refers general to a forging process in which the dimensions of an item are altered using dies into which the item is forced.

Referring still to FIG. 3, as is depicted, the exemplary mounting assembly 144 defines an axial direction $A_2$ and a radial direction $R_2$. Additionally, the body 184 of the grommet 172 defines an inner surface 186 and an outer surface 188. As shown, the inner surface 186 is positioned inward of the outer surface 188 along the radial direction $R_2$. Moreover, the grommet 172 includes an upper portion 190 and a lower portion 192. The upper portion 190 is positioned at one end of the grommet 172 along the axial direction $A_2$ and the lower portion 192 is positioned at an opposite end of the grommet 172 along the axial direction $A_2$. For the embodiment depicted, the inner surface 186 of the body 184 tapers outwardly generally along the radial direction $R_2$ at the upper portion 190 and at the lower portion 192. More particularly, for the embodiment depicted, at least about a top third of the inner surface 186 of the grommet 172 tapers outwardly generally along the radial direction $R_2$ and at least about a bottom third of the inner surface 186 of the grommet 172 similarly tapers outwardly generally along the radial direction $R_2$. However, in other exemplary embodiments, at least about a top quarter and bottom quarter of the inner surface 186 may taper outwardly generally along the radial direction $R_2$, or at least about a top fifth and a bottom fifth of the inner surface 186 may taper outwardly generally along the radial direction $R_2$.

The metal grommet 172 may reduce an amount of wear on the forward end 112 of the outer liner 108 as the outer liner 108 moves inwardly and outwardly generally along the radial direction $R_1$ relative to the outer dome 118. Additionally, tapering an upper portion 190 and a lower portion 192 of the inner surface 186 of the body 184 of the grommet 172 may allow for a small degree of rotation of the outer liner 108 relative to the outer annular dome 118 without applying a relatively large point force on the mounting assembly 144 or the forward end of the outer liner 108 (which could potentially damage one or both components).

Referring still to FIG. 3, the exemplary combustor assembly 100 depicted additionally defines a gap 194 between the forward end 112 of the outer liner 108 and the enclosed surface 120 of the outer annular dome 118 defining the slot 122. The combustor assembly 100 may be designed such that a length of the gap 194 along the axial direction $A_1$ of the turbofan engine 10 allows for only a predetermined amount of airflow therethrough into the combustion chamber 114. It should be appreciated, however, that in other exemplary embodiments, a cap or other suitable structure may be positioned in the slot 122 between the forward end 112 of the outer liner 108 and the enclosed surface 120 to seal the attachment point depicted in FIG. 3. Such a configuration may ensure that no airflow is permitted around the forward end 112 of the outer liner 108 into the combustion chamber 114.

Moreover, referring back to FIG. 2, it should be appreciated that the forward end 106 of the inner liner 102 may be attached to the inner dome 116 in substantially the same manner that the forward end 112 of the outer liner 108 is attached to the outer dome 118. More particularly, the mounting assemblies 144 attaching the forward end 106 of the inner liner 102 to the inner annular dome 116 may be configured in substantially the same manner as the mounting assemblies 144 attaching the forward end 112 of the outer liner 108 to the outer annular dome 118. For example, the mounting assemblies 144 attaching the forward end 106 of the inner liner 102 to the inner annular dome 116 may also include a pin, a bushing positioned around the pin, and a metal grommet positioned in an opening defined in the forward end 106 of the inner liner 102. Such a grommet may include an inner collar positioned adjacent to an inner surface of the inner annular dome 116 and an outer collar positioned adjacent to an outer surface of the inner annular dome 116. Additionally, the grommet may include an inner surface and an outer surface, with the inner surface tapering outwardly at an upper portion and a lower portion. Such a grommet may also prevent damage to the forward end 106 of the inner liner 102 as the forward end 106 of the inner liner 102 thermally expands relative to the inner annular dome 116 (and as the forward end 106 of the liner 102 slides inwardly and outwardly along the bushing generally along the radial direction $R_1$).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:
    an annular dome including an enclosed surface defining a slot;
    a liner at least partially defining a combustion chamber and extending between an aft end and a forward end, the forward end of the liner received within the slot of the annular dome; and
    a mounting assembly including a pin extending through the slot and an opening in the forward end of the liner, the mounting assembly further including a metal grommet positioned in the opening in the forward end of the liner around the pin to protect the liner;
    wherein the mounting assembly further includes a bushing, wherein the bushing is positioned around the pin within the slot, and wherein the grommet is positioned around the bushing and configured to slide along the bushing;
    wherein the liner is comprised of a ceramic matrix composite material, and wherein the annular dome is comprised of a metal material;
    wherein the grommet includes an inner collar positioned adjacent to an inner surface of the liner, an outer collar positioned adjacent to an outer surface of the liner, and a body between the inner collar and the outer collar, and wherein at least one of the inner collar or the outer collar is attached to the body by swaging.

2. The combustor assembly of claim 1, wherein the annular dome includes a base plate and a yolk, wherein the base plate and the yolk extend substantially parallel to one another, and wherein the enclosed surface of the dome includes a surface of the base plate and a surface of the yolk such that the slot is defined between the base plate and the yolk.

3. The combustor assembly of claim 2, wherein the pin of the mounting assembly extends through the yolk of the annular dome, the forward end of the liner, and the base plate of the annular dome.

4. The combustor assembly of claim 1, wherein the liner is an outer liner and wherein the annular dome is an outer annular dome.

5. The combustor assembly of claim 1, wherein the liner is an inner liner and wherein the annular dome is an inner annular dome.

6. The combustor assembly of claim 1, wherein the outer collar is swaged onto the body of the grommet adjacent to an outside surface of the liner.

7. The combustor assembly of claim 1, wherein the mounting assembly defines an axial direction and a radial direction, wherein the grommet includes a body defining an inner surface and an outer surface, wherein the grommet further includes an upper portion at one end along the axial direction and a lower portion at an opposite end along the axial direction, and wherein the inner surface of the body tapers outwardly generally along the radial direction at the upper portion and at the lower portion.

8. The combustor assembly of claim 7, wherein at least a top third of the inner surface of the grommet tapers outwardly along the radial direction.

9. The combustor assembly of claim 7, wherein at least a bottom third of the inner surface of the grommet tapers outwardly along the radial direction.

10. A gas turbine engine comprising:
    a compressor section;
    a turbine section mechanically coupled to the compressor section through a shaft; and
    a combustor assembly disposed between the compressor section and the turbine section, the combustor assembly including
    an annular dome including an enclosed surface defining a slot;
    a liner at least partially defining a combustion chamber and extending between an aft end and a forward end, the forward end of the liner received within the slot of the annular dome; and
    a mounting assembly including a pin extending through the slot and an opening in the forward end of the liner, the mounting assembly further including a metal grommet positioned in the opening in the forward end of the liner around the pin to protect the liner;
    wherein the mounting assembly further includes a bushing, wherein the bushing is positioned around the pin within the slot, and wherein the grommet is positioned around the bushing and configured to slide along the bushing;
    wherein the liner is comprised of a ceramic matrix composite material, and wherein the annular dome is comprised of a metal material;

wherein the grommet includes an inner collar positioned adjacent to an inner surface of the liner, an outer collar positioned adjacent to an outer surface of the liner, and a body between the inner collar and the outer collar, and wherein at least one of the inner collar or the outer collar is attached to the body by swaging.

11. The gas turbine of claim 10, wherein the annular dome includes a base plate and a yolk, wherein the base plate and the yolk extend substantially parallel to one another, and wherein the enclosed surface of the dome includes a surface of the base plate and a surface of the yolk such that the slot is defined between the base plate and the yolk.

12. The gas turbine of claim 11, wherein the pin of the mounting assembly extends through the yolk of the annular dome, the forward end of the liner, and the base plate of the annular dome.

13. The gas turbine of claim 10, wherein the mounting assembly defines an axial direction and a radial direction, wherein the grommet includes a body defining an inner surface and an outer surface, wherein the grommet further includes an upper portion at one end along the axial direction and a lower portion at an opposite end along the axial direction, and wherein the inner surface of the body tapers outwardly generally along the radial direction at the upper portion and at the lower portion.

* * * * *